United States Patent
Burke

(10) Patent No.: US 7,153,427 B2
(45) Date of Patent: *Dec. 26, 2006

(54) NITROGEN RECOVERY SYSTEM AND METHOD USING HEATED AIR AS STRIPPING GAS

(75) Inventor: Dennis A. Burke, Olympia, WA (US)

(73) Assignee: Environmental Energy & Engineering Co., Olympia, WA (US)

(*) Notice: Subject to any disclaimer, the term of this patent is extended or adjusted under 35 U.S.C. 154(b) by 62 days.

This patent is subject to a terminal disclaimer.

(21) Appl. No.: 10/826,131

(22) Filed: Apr. 16, 2004

(65) Prior Publication Data

US 2005/0139546 A1    Jun. 30, 2005

Related U.S. Application Data

(63) Continuation-in-part of application No. 10/625,198, filed on Jul. 22, 2003, now Pat. No. 6,866,779.

(60) Provisional application No. 60/398,296, filed on Jul. 22, 2002.

(51) Int. Cl.
*C02F 3/28* (2006.01)
*C05F 3/00* (2006.01)

(52) U.S. Cl. .................. 210/603; 210/631; 210/903; 423/237; 71/10

(58) Field of Classification Search .......... 210/603, 210/604, 605, 610, 630, 631, 903; 71/9, 71/10, 21; 423/220, 237, 242.1; 95/243
See application file for complete search history.

(56) References Cited

U.S. PATENT DOCUMENTS

| | | | |
|---|---|---|---|
| 2,097,454 A * | 11/1937 | Fischer | ................. 423/220 |
| 3,175,687 A | 3/1965 | Jones | |
| 3,642,618 A | 2/1972 | Silva | |
| 3,738,784 A | 6/1973 | Clark et al. | |
| 3,772,190 A | 11/1973 | Eisenmann | |
| 3,870,635 A | 3/1975 | Clarke-Pounder | |
| 3,959,131 A | 5/1976 | Ramirez et al. | |
| 4,076,515 A | 2/1978 | Rickard | |
| 4,100,066 A | 7/1978 | Bloomer et al. | |
| 4,267,050 A | 5/1981 | Conway et al. | |
| 4,372,856 A * | 2/1983 | Morrison | ................. 210/603 |
| 4,510,057 A | 4/1985 | Rowe et al. | |
| 4,559,146 A | 12/1985 | Roets | |
| 4,563,274 A | 1/1986 | Rothon et al. | |
| 4,564,457 A | 1/1986 | Cairo, Jr. et al. | |

(Continued)

FOREIGN PATENT DOCUMENTS

DE    3901404    * 8/1989

(Continued)

OTHER PUBLICATIONS

"Ammonia Stripping," *Wastewater Technology Fact Sheet*, U.S. Environmental Protection Agency, Washington, DC, Sep. 2000, 4 pages.

(Continued)

*Primary Examiner*—Fred G. Prince
(74) *Attorney, Agent, or Firm*—Christensen O'Connor Johnson Kindness PLLC

(57) ABSTRACT

A process for the recovery of nitrogen from anaerobically digested liquid waste and for the collection of the nitrogen as nitrate compounds that can be used to produce fertilizer and compost, includes stripping ammonia from anaerobically digested liquid waste, and converting the ammonia into nitrates via nitrification. The stripping gas is heated above ambient atmospheric temperature to improve nitrogen recovery. The heat can be reclaimed by burning gases generated during the anaerobic digestion process.

37 Claims, 1 Drawing Sheet

U.S. PATENT DOCUMENTS

| | | | |
|---|---|---|---|
| 4,765,900 A * | 8/1988 | Schwoyer et al. | 210/603 |
| 4,790,944 A | 12/1988 | Gordon et al. | |
| 4,894,162 A | 1/1990 | Cournoyer et al. | |
| 4,900,452 A | 2/1990 | Angles et al. | |
| 4,959,084 A | 9/1990 | Wolverton et al. | |
| 5,015,384 A | 5/1991 | Burke | |
| 5,053,140 A | 10/1991 | Hurst | |
| 5,080,802 A | 1/1992 | Cairo, Jr. et al. | |
| 5,310,485 A | 5/1994 | Roshanravan | |
| 5,354,458 A | 10/1994 | Wang et al. | |
| 5,397,461 A | 3/1995 | Augustin | |
| 5,651,890 A * | 7/1997 | Trost | 210/603 |
| 5,670,047 A | 9/1997 | Burke | |
| 5,702,612 A | 12/1997 | Wang | |
| 5,858,768 A | 1/1999 | Bonnin et al. | |
| 5,891,711 A | 4/1999 | Carter | |
| 5,900,159 A | 5/1999 | Engel et al. | |
| 6,113,786 A | 9/2000 | Burke | |
| 6,113,789 A | 9/2000 | Burke | |
| 6,299,774 B1 | 10/2001 | Ainsworth et al. | |
| 6,309,547 B1 | 10/2001 | Burke | |
| 6,368,849 B1 * | 4/2002 | Norddahl | 210/603 |
| 6,464,875 B1 | 10/2002 | Woodruff | |
| 6,500,340 B1 | 12/2002 | Burke | |
| 6,569,332 B1 | 5/2003 | Ainsworth et al. | |
| 6,616,844 B1 | 9/2003 | Park et al. | |
| 6,824,682 B1 * | 11/2004 | Branson | 210/603 |
| 2001/0020603 A1 | 9/2001 | Moorehead et al. | |
| 2003/0052061 A1 | 3/2003 | Burke | |
| 2003/0141244 A1 | 7/2003 | Hansen et al. | |
| 2004/0164021 A1 * | 8/2004 | Li et al. | 210/603 |

FOREIGN PATENT DOCUMENTS

| | | | |
|---|---|---|---|
| EP | 0474895 | * | 9/1990 |
| GB | 2058737 A | | 4/1981 |
| JP | 60-064684 A | | 4/1985 |
| JP | 6-71293 A | | 3/1994 |

OTHER PUBLICATIONS

"Beginner's Guide to Nitrification/Denitrification Technologies," <http://www.envstudies.brown.edu/Thesis/2002/caton/WW-WTFpages/WWWTFgeneral.htm> [retrieved 2003], 4 pp.

"Biological Treatment of Gases (Biofilter)," n.d., <http://www.res.titech.ac.jp/~junkan/english/deodorize/> [retrieved Jul. 16, 2003], pp. 1-3.

Burke, D.A., *Dairy Waste Anaerobic Digestion Handbook: Options for Recovering Beneficial Products From Dairy Manure*, Environmental Energy Company, Olympia, Wash., Jun. 2001, 54 pages.

Crawford, H.B., and R.J. Kepler (eds.), *Chemical Engineers' Handbook*, 5th ed., McGraw-Hill, New York, 1973, Chap. 14, "Gas Absorption," pp. 2-16.

Crawford, H.B., and R.J. Kepler (eds.), *Chemical Engineers' Handbook*, 5th ed., McGraw-Hill, New York, 1973, Chap. 19, "Gravity Sedimentation Operations," pp. 44-106.

Heitner, H.I., "Flocculating Agents," *Kirk-Othmer Concise Encyclopedia of Chemical Technology*, 4th ed., John Wiley & Sons, New York, 1999, pp. 869-871.

Joshi, J.A., et al., "Gaseous Ammonia Removal in Biofilters: Effect of Biofilter Media on Products of Nitrification," Department of Environmental Sciences, Rutgers, State University of New Jersey, at least as early as Jun. 1998, 11 pages.

Nicolai, R.E., et al., "Biofilter Demonstration Project: Final Report," Biosystems and Agricultural Engineering Department, University of Minnesota, Aug. 13, 1999, 9 pages.

Nicolai, R.E., "Biofilter Design Information: BAEU-18," *Biosystems and Agricultural Engineering Department, University of Minnesota Extension Program*, Jun. 1998, <http://www.bae.umn.edu/extens/aeu/baeu18.html> [retrieved Dec. 18, 2001], 10 pages.

Nicolai, R.E., et al., "Demonstration Biofilter on Dairy and Swine Facilities," *Biosystems and Agricultural Engineering Department, University of Minnesota, 2000 Annual Report*, Feb. 27, 2001, <http://www.bae.umn.edu/annrpt/2000/research/livestock13.html> [retrieved Dec. 18, 2001], 10 pages.

Sadowsky, M., et al., "Final Project Report—Biofilter Microbes," University of Minnesota, Aug. 8, 1999, 15 pages.

Schmidt, D., et al., "Biofilters for Odor Control," University of Minnesota Extension Service, 2000, 2 pp.

"Waste Processing and Resource Recovery (WP&RR)," *New Jersey—NASA Specialized Center of Research and Training for Bioregenerative Life Support Monthly Report*, Jul. 30, 1998, <http://nj-nscort.rutgers.edu/visitor/rnews/njnscort/Njn-0798.html> [retrieved Dec. 18, 2001], 3 pages.

Yarar, B., "Flotation," *Kirk-Othmer Concise Encyclopedia of Chemical Technology*, 4th ed., John Wiley & Sons, New York, 1999, pp. 871-872.

* cited by examiner

NITROGEN RECOVERY SYSTEM AND METHOD USING HEATED AIR AS STRIPPING GAS

CROSS-REFERENCES TO RELATED APPLICATIONS

This application is a continuation-in-part of application Ser. No. 10/625,198, filed Jul. 22, 2003, now U.S. Pat. No. 6,866,779, which claims the benefit of Provisional Application No. 60/398,296, filed Jul. 22, 2002, both incorporated herein by reference in their entirety.

FIELD OF THE INVENTION

The field of the invention is related to the removal and recovery of nitrogen from anaerobically digested liquid waste and the collection of the nitrogen as nitrates and organic nitrogen compounds that can be used to produce fertilizer and compost.

BACKGROUND OF THE INVENTION

In U.S. application Ser. No. 10/625,198, fully incorporated herein by reference in its entirety, a method is described that is related to the recovery of nitrogen from ammonia that is produced from anaerobic digestion of waste. In the prior process, atmospheric air at ambient temperature is used as the stripping gas. However, if ambient air is used, especially during winter, the temperature of the digested liquid waste can be significantly reduced to a temperature, such as 40° F. to 50° F., that will lower the amount of ammonia and hydrogen sulfide that is stripped from the digested liquid waste. The lower temperature will also negatively affect the efficiency of the biofilter that fixes the nitrogen into a solid form.

Accordingly, there is a need to improve on the prior method to more efficiently recover ammonia, and subsequently nitrogen. The present invention overcomes the drawbacks of the prior method and has further related advantages.

SUMMARY OF THE INVENTION

The present invention is related to a process for the recovery of nitrogen from wastewater liquids, and collection and sequestration of the nitrogen in organic matter taking the form of inorganic nitrogen and organic nitrogen compounds. Recovered nitrate, ammonia, and organic nitrogen compounds can be used to produce nitrogen-rich organic compost fertilizer. One embodiment of the method according to the invention can recover nitrogen from liquid waste to produce nitrogen-rich fertilizer. The process produces less greenhouse gases as compared with the typical nitrification and denitrification processes. Such reduction in ammonia levels and greenhouse gases is thought to produce beneficial health benefits for people and lessen the environmental impact.

In one embodiment of the present invention, a method for recovering nitrogen from liquid waste is provided. The method includes anaerobically digesting liquid waste in an anaerobic digester. Through this process, digested liquid waste is produced containing amounts of dissolved carbon dioxide, hydrogen sulfide, and ammonia. Dissolved ammonia can exist in liquid as ammonium ions. The digested liquid waste can be stripped of carbon dioxide and ammonia with a heated gas, such as heated air that is heated above the ambient atmospheric temperature, or combustion gas. Upon stripping the carbon dioxide, the ammonium ions form ammonia gas and the ammonia gas is likewise stripped from the digested liquid waste. The gases leaving the stripping unit can be fed to a biofilter containing bacteria that convert the stripped ammonia into nitrate compounds and bacterial biomass, for example.

In one embodiment of the invention, the heated stripping gas is produced by collecting the combustible gases, such as methane, which are generated during the digestion process, and burned. The burning of the methane can be used in power generation equipment. Alternatively, the methane and other combustible gases can be burned in a flare stack. Heat to heat stripping air can be reclaimed during the burning process via several methods. For example, a heat exchanger can be provided to reclaim heat from various hot media, such as hot water, condensate, steam, and combustion gas. Alternatively, the combustion gas produced during burning can be used as the stripping gas. However, combustion gas will contain an excess amount of carbon dioxide that will lower the pH of the digester effluent and therefore favor the removal of hydrogen sulfide rather than ammonia nitrogen. Stripped hydrogen sulfide can be converted into sulfur-containing compounds in a biofilter. Heated stripping gas can be collected in the form of heated ambient atmospheric air from a building housing the power generation equipment.

Using heated air as the stripping gas will increase the removal of carbon dioxide and ammonia. Using heated air will also increase the temperature of the biofilter, thus increasing moisture content (90+% saturation from stripping), biological activity, and nitrogen and/or hydrogen sulfide fixation into solid compounds.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
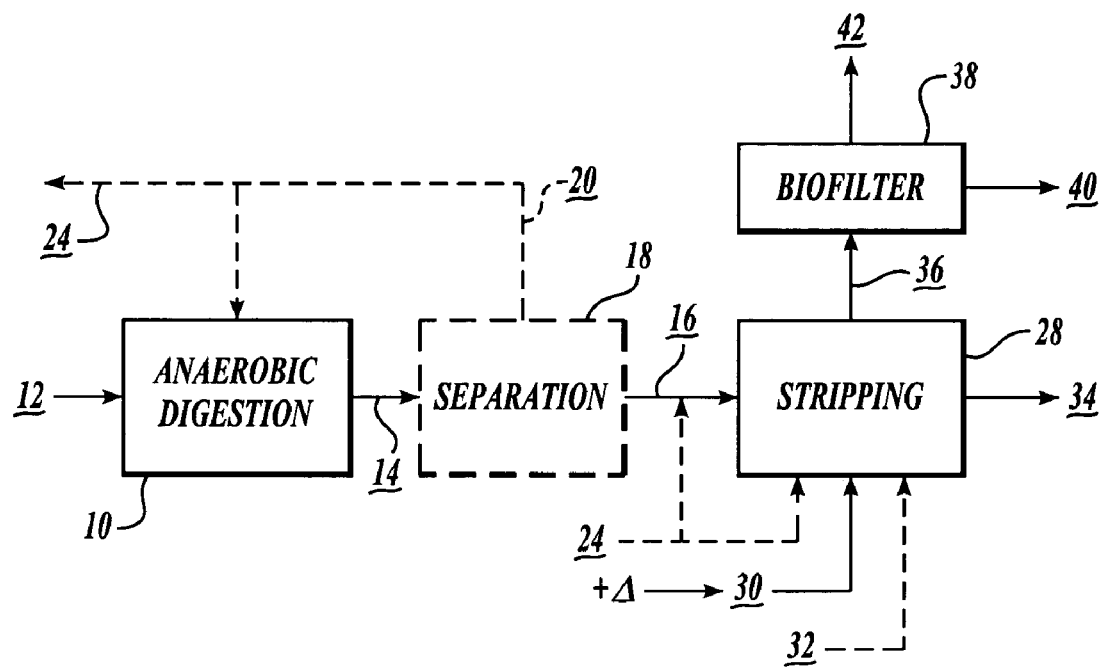
FIG. 1 is a schematic illustration of one embodiment of a method according to the present invention.

FIG. 1 schematically illustrates one embodiment of a method according to the present invention. Anaerobically digesting liquid waste 10, such as flush water containing cow manure from dairy farms, is followed by gas stripping or desorption 28 of dissolved carbon dioxide and ammonia from the digested liquid. The stripped gases are treated in a bacteria-activated "biofilter" 38, that converts ammonia into nitrate compounds and other nitrogenous compounds that can then be used as fertilizer. The method according to the invention combines the processes of anaerobic digestion, desorption, and nitrification to advantageously recover nitrogen, which would otherwise be discharged into the atmosphere.

The system to carry out the method according to the present invention, includes an anaerobic digester 10, a gas desorption or stripping unit 28, a nitrification absorption unit or biofilter 38, and optionally a solids separator 18. It is to be appreciated that the figure represents a portion of what may be a larger integrated system. For example, the influent liquid waste 12 may have undergone pretreatment before arriving at the anaerobic digester 10, such as by being processed through several screens and sedimentation, or holding ponds. However, pretreatment of the waste in this manner may also potentially reduce the amount of solids that can be converted into valuable products. These predigester unit operations are described in *Dairy Waste Anaerobic Digestion Handbook*, by Dennis A. Burke (2001), incorporated herein by reference in its entirety. The Handbook is available on the Internet at www.makingenergy.com. The system according to the invention may be integrated into existing dairy farms to recover the nitrogen that is otherwise lost into the atmosphere through the conventional process of treating water generated by dairy operations.

According to the invention, the anaerobic digester 10 digests the influent liquid waste stream 12. The influent liquid waste 12 can include, but is not limited to, water, collected during the typical operation of a dairy farm. Anaerobic digestion 10 produces digested liquid waste 14 through the breakdown of organic material via a microbial population that lives in the oxygen-free environment in the digester 10. When organic matter decomposes in an anaerobic environment, the bacteria produce, at a minimum, methane and carbon dioxide gas. Nitrogen-containing compounds are converted to ammonia, and sulfur-containing compounds are converted into hydrogen sulfide. In the system according to the invention, these gases can be vented from the digester 10 via vent line 22. Some gases are soluble and can remain dissolved within the liquid. Vented methane gas can be used as an energy source. Methane, and other combustible gases, produced during digestion, and drawn from vent line 22 can be routed to power generation, block 44. For example, boilers can burn the methane gas to produce steam that can be used to drive turbines. Heat can be recovered from the boiler via numerous methods. Forms of power generation include steam turbines, methane engines, and fuel cells. Each power generation method produces some amount of heat that can be reclaimed as heated stripping gas. Alternatively to power generation, the methane and other combustible gases can be disposed of by flaring to a stack. Heat can be reclaimed by this later method as well.

The digested liquid waste 14, leaving the digester 10, includes water, soluble organic and inorganic compounds, such as soluble gases, and insoluble organic and inorganic compounds. Reference is again made to the *Dairy Waste Anaerobic Digestion Handbook* for a more detailed description of anaerobic digestion. In particular, representative examples of suitable anaerobic digesters for use in one embodiment of the method according to the present invention are described therein, including, but not limited to, covered anaerobic lagoons, plug flow digesters, mesophilic completely mixed digesters, thermophilic completely mixed digesters, anaerobic contact digesters, and hybrid contact/fixed film reactors, and the like. Such digesters are at least suitable for processing dairy waste. Other anaerobic digesters include packed fixed film reactors, upflow anaerobic sludge blanket reactors (UASB), and horizontal baffled reactors, described also in the Handbook.

After anaerobic digestion 10, the liquid waste 12 contains carbon dioxide, ammonia, hydrogen sulfide, and other dissolved inorganic components, such as alkaline compounds. Typically, the majority of ammonia remains dissolved in digested waste liquid 14, as the ammonium ion. The pH of digested liquid waste 14 can be between about 7 and about 8. The anaerobic digestion process also produces carbon dioxide that dissolves in the digested liquid waste 14. The amount of dissolved carbon dioxide is a function of at least the partial pressure of carbon dioxide, which is typically between about 25% to about 40% of the total pressure within the anaerobic digester 10. In accordance with the present invention, the anaerobic digestion process can be used to produce a digested liquid product, which has a substantial amount of carbon dioxide and ammonia dissolved therein. The anaerobic digestion process also uses heat through the thermophilic or mesophilic digestion of the liquid waste influent 12. Since the subsequent process of ammonia stripping is both temperature and pH dependent, higher digestion temperatures and pH values in the anaerobic digester 10 are advantageous in the stripping process to recover ammonia. Lower pH values are advantageous in the stripping process to recover hydrogen sulfide. Higher pH values are achieved by stripping carbon dioxide, lower pH values are achieved by carbon dioxide through the stripping process by using a high carbon dioxide content gas. Both low and high pH values to remove hydrogen sulfide and ammonia can be achieved by first stripping with the combustion gas followed by stripping with air.

In one embodiment of the present invention, a liquid/solid separator 18 can be provided after anaerobic digestion 10. The separator 18 is an optional piece of equipment. Separation is optional, according to one embodiment of the invention. Digested liquid waste 14 includes a solid phase and a liquid phase. The separator 18 is provided to separate the solid phase from the liquid phase. The separated solid phase 20 can be recycled to the anaerobic digestion process 10. Additionally, or alternatively, the separated solid phase 20 can be diverted to other operations, which process the solid phase into compost or other beneficial products 24, or alternatively used in biofilter 38. The solid phase will contain some nitrogen compounds and the majority of the phosphorus. Digested liquid waste having reduced solids is represented by reference numeral 16. Representative separators 18 include filters, screens, screw presses, flotation, and gravity separators. A suitable flotation separator is described in U.S. application Ser. No. 10/194,451, filed Jul. 11, 2002, incorporated herein by reference in its entirety. Solid-phase separation methods and units are explained in many engineering textbooks, such as the *Chemical Engineers' Handbook*, 5th ed., by Perry and Chilton, incorporated herein in its entirety by reference. A stripping unit 28 to recover ammonia follows the separator 18 or, if no separator 18 is provided, the anaerobic digester 10.

According to the present invention, digested liquid waste, containing solids 14 or reduced solids 16, is stripped of at least some ammonia, carbon dioxide, or hydrogen sulfide in a stripping unit 28. As used herein, digested liquid waste can refer to digested liquid waste containing solids 14, or digested liquid waste with reduced solids 16 if the optional separator 18 is used prior to stripping 28. The stripping unit 28 receives digested liquid waste 14 or 16, containing at a minimum dissolved carbon dioxide, dissolved hydrogen sulfide and dissolved ammonia. Carbon dioxide, hydrogen sulfide and ammonia (acting as the sorbate) can be stripped from the liquid by contact with a stripping gas 30 (acting as the sorbent) through a process known as desorption. The stripping gas 30 is preferably heated above the prevailing ambient atmospheric temperature. In one embodiment of the present invention, the heated stripping gas 30 is produced in the power generation step, block 44. Heat produced during power generation can be reclaimed by employing various methods. For example, the combustion gas that is produced during burning of the methane, or other combustible gas produced via the digestion process, can be used as the stripping gas 30. Combustion gas used in stripping can have a carbon dioxide content of at least 30% by volume and at least 5% oxygen by volume. The temperature of the heated stripping gas 30 in this instance can be about 350° F. or greater. Combustion gas contains higher amounts of carbon dioxide as compared with atmospheric air that will tend to lower the pH. A lowering of the pH favors the removal of hydrogen sulfide gas as compared with ammonia gas. This is due, it is believed, to the hydrogen sulfide ions in solution (HS⁻) gaining a hydrogen ion (H+) under reduced pH conditions, and thus increasing the amount of hydrogen sulfide ($H_2S$) in solution. Heat can also be reclaimed using heat exchangers wherein ambient atmospheric air can be directed to pass on one side of the heat exchanger and hot water, condensate, steam, or combustion gas is passed on the opposite side of the heat exchanger to thus transfer heat from the hot medium to the relatively colder ambient air. The temperature of air is thus heated above the ambient temperature. The temperatures achieved by heat exchangers can be as much as about 200° F. or greater. Alternatively, a power generator can be housed in a building whereby the ambient air surrounding the power generation equipment is heated via radiant and convection means. The air from the building can be collected and used as the heated stripping gas 30. Air heated via this later method can be about 80° F. to about 110° F. Heated stripping gas 30 produced from radiant, convection, and conduction sources, such as heated atmospheric air, will be lower in carbon dioxide as compared with combustion gas, and thus will be more efficient at removing carbon dioxide. The reduction in carbon dioxide will thus increase the pH of the digested liquid waste and improve ammonia recovery. In one embodiment of the present invention, therefore, the pH of the digested liquid waste may first be lowered by stripping with heated air, effectively removing carbon dioxide and ammonia, followed by a second stripping process using combustion gas, effectively lowering the pH, and stripping hydrogen sulfide from the digested liquid waste. However, in other embodiments, stripping hydrogen sulfide with combustion gas can be followed by stripping ammonia with heated air. In yet other embodiments, heated air or combustion gas can be employed as the sole stripping gas 30. Stripping with heated air raises pH, removes acidic gases, such as carbon dioxide, from the digested liquid waste (with or without solids) for ammonia removal, while stripping with combustion gas lowers pH, adds acidic gases, such as carbon dioxide, to the digested liquid waste (with or without solids).

The stripping gas 30 can contain comparatively lower amounts of carbon dioxide and ammonia as compared with the digested liquid waste 14 or 16, so as to provide a concentration gradient that will cause the diffusion of the carbon dioxide and ammonia from the digested liquid waste 14 or 16 into the stripping gas 30. It is to be appreciated that molecular diffusion is but one process that can be occurring to cause the carbon dioxide and ammonia to transfer into the stripping gas 30. As desorption of carbon dioxide takes place, the pH of the digested liquid waste 14 or 16 may increase due to the removal of the carbon dioxide. As the pH of the digested liquid waste increases, some of the ionized ammonia (ammonium ions) will be converted into gaseous ammonia. A portion of this ammonia may be stripped in conjunction with the carbon dioxide. Eventually, the carbon dioxide concentration of the digested liquid waste 14 or 16 will be reduced, such that the concentration of carbon dioxide approaches equilibrium with the concentration of the carbon dioxide of the stripping gas 30. At this point, the pH of the digested liquid waste 14 or 16 can be between about 8 to about 9. At this pH, the ammonium ions tend to form into ammonia and are removed by the stripping gas. As the gaseous ammonia is removed, ammonium ions continue to be converted to gaseous ammonia. The fundamentals of desorption or stripping is explained in many engineering books, such as the *Chemical Engineers' Handbook,* 5th ed., by Perry and Chilton, pp. 14–2 to 14–16, incorporated herein by reference, in its entirety. Typically, packed towers or plate towers are used to carry out gas desorption from liquids, each type of tower having its advantages and disadvantages, depending on the ultimate application. The engineering literature has fuller descriptions of suitable stripping towers. For example, reference is made to the United States Environmental Protection Agency Paper, EPA 832-F-00-019 (September 2000), incorporated herein by reference in its entirety.

As an alternative embodiment, caustic, or alkaline chemicals 26, may be added to the digested liquid waste 14 or 16, to raise or lower the pH to assist in the stripping of ammonia or hydrogen sulfide from the digested liquid waste. As shown in the figure, alkalinity can be added to the digested liquid waste 14 or 16 either before the stripping unit 28 or to the stripping unit 28. The amount of alkalinity can be varied. A suitable amount of alkalinity to add can be obtained by balancing the consumption of energy required in the stripping process and the cost of alkaline chemical addition. A suitable alkaline compound can be sodium or calcium hydroxide, and the like. Magnesium hydroxide or magnesium oxide can also be added, in this case, before or after anaerobic digestion.

As another alternative embodiment, the temperature of the digested liquid waste 14 or 16 can be increased. Increasing the temperature of the digested liquid waste 14 or 16 will result in an increased rate of stripping the ammonia from the liquid. A heat exchanger can be provided in the line to the stripping unit 28 or, additionally or alternatively, the stripping unit can be provided with a jacket surrounding the stripping vessel and so provide for heat exchange between a comparatively hot fluid and the digested liquid waste 14 or 16. Heat-providing media 32, such as steam, or other condensable fluids, or hot liquids, can be introduced directly, or alternatively, on the shell or tube side of a heat exchanger or the jacket of the stripping vessel 28. The temperature of the digested waste liquid 14 or 16 may be varied according to the desired amount of stripping performance. The system can readily be provided with heat transfer equipment to provide heat, in addition to the heat that is produced during anaerobic digestion.

Increasing the pH of the digested liquid waste 14 or 16 by introducing alkalinity to the digested liquid waste 14 or 16, either before the stripping unit 28 or in the stripping unit 28, and raising the temperature of the digested liquid waste 14 or 16, is believed to increase the rate at which ammonia can be stripped from the digested liquid waste 14 or 16. The stripping unit 28 can produce a stripped liquid-phase component 34 having reduced quantities of soluble compounds and a gas-phase component 36 containing the soluble compounds.

Decreasing the pH of the digested liquid waste 14 or 16 can be achieved by adding acidity. Such pH reduction can come about through the introduction of acidic compounds, such as but not limited to hydrochloric, sulfuric, and phosphoric acids. The stripped liquid waste 34 is discharged from the stripping unit 28 and may be processed further. Stripped gas 36 from the stripping unit 28, contains, at a minimum, ammonia hydrogen, sulfide, or both. A nitrification biofilter 38, located downstream of the stripping unit 28, can be used to convert the ammonia that is stripped from the digested liquid waste 14 or 16 into nitrogenous compounds, other than ammonia, by bacterial activity. Nitrate compounds are the result of a process referred to as nitrification. The literature is replete with descriptions of the nitrification process that oxidizes ammonia into nitrite by *Nitrosomonas* bacteria, and from nitrite to nitrate by *Nitrobacter* bacteria. The nitrate compounds 40 can be collected, and further processed, and/or refined into desirable products, such as nitrogen-rich compost, or fertilizer. The gas-phase component 42 can be discharged from the biofilter 38.

A nitrification biofilter 38 according to the invention may include a fibrous material, such as compost or a synthetic porous media capable of supporting a bacterial consortium for the conversion of ammonia to nitrate compounds and organic biomass containing nitrogen. The biofilter 38 can have sufficient nutrient value to support the bacterial consortia. Additionally or alternatively, nutrients and micronutrients may be added to ensure adequate bacterial performance. Moisture may also be added, if sufficient moisture is not already present in the gas 36 from the stripping unit 28. The quantity of moisture present in the gas 36 may be a function of the temperature at which the digestion and stripping phases are carried out. According to the present invention, the biofilter can support a bacterial consortia that will absorb and precipitate the ammonia gas into nitrate compounds and/or organic biomass containing nitrogen. Depending on the type of biofilter used, the biofilter media 40 can be replaced from time to time with new media. During the replacement of the biofilter media, the newer media may be seeded with bacterial consortia of the previous filter media. The filter media that are removed will be substantially higher in nitrogen compounds than the original filter media.

Biofilters are presently being used to eliminate odors from buildings, such as barns, by venting the barn air through a bed of organic material. As the air passes through the organic medium, microorganisms convert the organic gases into carbon dioxide and water. Literature on biofiltration regarding the recovery of nitrogen from ammonia is also available. For example, reference is made to the articles, "Biofilters for Odor Control," D. Schmidt, et al., University of Minnesota, and "Gaseous Ammonia Removal in Biofilters: Effect of Biofilter Media on Products of Nitrification," J. A. Joshi et al., Rutgers, The State University of New Jersey, both incorporated herein by reference in their entirety.

Alternatively, aerobic biofiltration can be utilized to convert hydrogen sulfide into sulfuric acid or elemental sulfur. Hydrogen sulfide gas is readily soluble in water. Thus, any hydrogen sulfide in the stripped gas 36 can be removed with the use of an aerobic biofilter.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for stripping ammonia from anaerobically digested liquid waste, comprising:
   (a) anaerobically digesting liquid waste into digested liquid waste containing ammonia and carbon dioxide;
   (b) stripping carbon dioxide from the digested liquid waste and raising the pH of the digested liquid waste;
   (c) stripping ammonia from the digested liquid waste; and
   (d) converting stripped ammonia into nitrogen-containing compounds in a biofilter.

2. The method of claim 1, wherein air heated to a temperature above the ambient air temperature is used to strip the carbon dioxide and ammonia.

3. The method of claim 1, further comprising collecting methane from anaerobically digesting liquid waste, and generating power from burning the methane.

4. The method of claim 3, further comprising collecting heated air surrounding power generation equipment and stripping the carbon dioxide and ammonia with the heated air.

5. The method of claim 4, wherein the temperature of the heated air is about 80° F. to about 100° F.

6. The method of claim 1, comprising stripping the carbon dioxide and the ammonia with steam.

7. The method of claim 1, comprising stripping the carbon dioxide and ammonia with heated air that is heated in a heat exchanger that uses hot water, steam, or combustion gas as the heating medium.

8. The method of claim 7, wherein said heated air temperature is greater than 200° F.

9. The method of claim 1, further comprising adding an alkaline chemical to the digested liquid waste that raises the pH of the digested liquid waste.

10. The method of claim 1, comprising stripping the carbon dioxide and ammonia with heated air that is heated in a boiler, generator, or fuel cell.

11. A method for removing hydrogen sulfide from anaerobically digested liquid waste, comprising:
    (a) anaerobically digesting liquid waste into digested liquid waste containing hydrogen sulfide;
    (b) stripping hydrogen sulfide from digested liquid with gas that lowers the pH of the digested liquid waste; and
    (c) converting stripped hydrogen sulfide into sulfur-containing compounds in a biofilter.

12. The method of claim 11, further comprising collecting methane from anaerobically digesting liquid waste, burning methane, and stripping hydrogen sulfide with combustion gas from burning the methane.

13. The method of claim 12, further comprising generating power from burning methane.

14. The method of claim 11, wherein said gas is combustion gas.

15. The method of claim 14, wherein the combustion gas temperature is greater than 250° F.

16. The method of claim 11, wherein the gas has a carbon dioxide content greater than 30% by volume.

17. The method of claim 11, wherein the gas has a carbon dioxide content greater than 30% by volume and an oxygen content greater than 5% by volume.

18. The method of claim 11, further comprising adding an acidic chemical to said digested liquid waste to lower the pH of the digested liquid waste.

19. The method of claim 11, wherein the acidic chemical is an organic or inorganic acid.

20. A method for removing ammonia and hydrogen sulfide from anaerobically digested liquid waste, comprising:
    (a) anaerobically digesting liquid waste into digested liquid waste containing ammonia, hydrogen sulfide, and carbon dioxide;
    (b) stripping hydrogen sulfide with a first gas and lowering the pH of the digested liquid waste;
    (c) stripping carbon dioxide with a second gas and raising the pH of the digested liquid waste;
    stripping ammonia with the second gas;
    converting stripped hydrogen sulfide into sulfur-containing compounds in a biofilter; and
    converting stripped ammonia into nitrogen-containing compounds in the biofilter.

21. The method of claim 20, further comprising collecting methane from anaerobically digesting liquid waste, burning methane, and stripping hydrogen sulfide with combustion gas from burning the methane.

22. The method of claim 21, further comprising generating power from burning methane.

23. The method of claim 21, wherein the first gas is combustion gas.

24. The method of claim 23, wherein the combustion gas temperature is greater than 250° F.

25. The method of claim 20, wherein the first gas has a carbon dioxide content greater than 30% by volume.

26. The method of claim 20, wherein the first gas has a carbon dioxide content greater than 30% by volume and an oxygen content greater than 5% by volume.

27. The method of claim 20, further comprising adding an acidic chemical to said digested liquid waste to lower the pH of the digested liquid waste for stripping the hydrogen sulfide.

28. The method of claim 20, wherein the acidic chemical is an organic or inorganic acid.

29. The method of claim 20, wherein the second gas is air heated to a temperature above the ambient air temperature.

30. The method of claim 20, further comprising collecting methane from anaerobically digesting liquid waste, and generating power from burning the methane.

31. The method of claim 30, further comprising collecting heated air surrounding power generation equipment and stripping the carbon dioxide and ammonia with the heated air.

32. The method of claim 31, wherein the temperature of the heated air is about 80° F. to about 110° F.

33. The method of claim 20, comprising stripping the carbon dioxide and the ammonia with steam.

34. The method of claim 20, comprising stripping the carbon dioxide and ammonia with heated air that is heated in a heat exchanger that uses hot water, steam, or combustion gas as the heating medium.

35. The method of claim 34, wherein said heated air temperature is greater than 200° F.

36. The method of claim 20, further comprising adding an alkaline chemical to the digested liquid waste that raises the pH of the digested liquid waste to strip the ammonia.

37. The method of claim 20, comprising stripping the carbon dioxide and ammonia with heated air that is heated in a boiler, generator, or fuel cell.

* * * * *

UNITED STATES PATENT AND TRADEMARK OFFICE
CERTIFICATE OF CORRECTION

PATENT NO. : 7,153,427 B2
APPLICATION NO. : 10/826131
DATED : December 26, 2006
INVENTOR(S) : D.A. Burke It is certified that error appears in the above-identified patent and that said Letters Patent is hereby corrected as shown below:

| COLUMN | LINE | ERROR |
|---|---|---|
| Title Page (56) Pg. 2, col. 1 | Refs. Cited (Other Publs., Item 2) | "WW-WTFpages/WWWTFgeneral.htm>" should read --WW-TFpages/WWTFgeneral.htm>-- |
| 8 (Claim 20, | 61 line 10) | "stripping" should read --(d) stripping-- |
| 8 (Claim 20, | 62 line 11) | "converting" should read --(e) converting-- |
| 8 (Claim 20, | 64 line 13) | "converting" should read --(f) converting-- |

Signed and Sealed this

Fifteenth Day of May, 2007

JON W. DUDAS
*Director of the United States Patent and Trademark Office*